United States Patent
Claussen et al.

[11] Patent Number: 6,025,065
[45] Date of Patent: Feb. 15, 2000

[54] PRODUCTION OF AN ALUMINIDE CONTAINING CERAMIC MOULDING

[75] Inventors: Nils Claussen, Auf den Schwarzen Bergen 15, D-21224 Rosengarten; Daniel Garcia; Rolf Janssen, both of Hamburg, all of Germany

[73] Assignee: Nils Claussen, Rosengarten, Germany

[21] Appl. No.: 08/860,533

[22] PCT Filed: Aug. 23, 1995

[86] PCT No.: PCT/EP95/03347

§ 371 Date: Nov. 19, 1997

§ 102(e) Date: Nov. 19, 1997

[87] PCT Pub. No.: WO96/20902

PCT Pub. Date: Jul. 11, 1996

[30] Foreign Application Priority Data

Dec. 29, 1994 [DE] Germany ............................. 44 47 130

[51] Int. Cl.[7] .............................. C04B 35/66; C22C 1/05
[52] U.S. Cl. ..................................... 428/307.7; 428/319.1; 428/325; 428/501; 428/539.5; 75/228; 501/87; 501/89; 501/97.2; 501/127; 501/105; 419/10
[58] Field of Search .................... 428/539.5, 501, 428/319.1, 307.7, 325; 75/228, 230, 232, 235; 501/87, 89, 97.2, 127, 105; 419/10, 19, 34, 32, 33, 40, 42; 264/667, 641, 654, 638, 645, 651, 431

[56] References Cited

U.S. PATENT DOCUMENTS

| | | |
|---|---|---|
| 4,762,558 | 8/1988 | German et al. . |
| 4,946,643 | 8/1990 | Dunmead et al. . |
| 5,077,246 | 12/1991 | Weaver et al. . |
| 5,079,099 | 1/1992 | Prewo et al. . |
| 5,326,519 | 7/1994 | Claussen . |
| 5,607,630 | 3/1997 | Claussen . |
| 5,679,297 | 10/1997 | Hwang . |

FOREIGN PATENT DOCUMENTS

| | | |
|---|---|---|
| 0 253 497 | 6/1987 | European Pat. Off. . |
| 0 490 245 | 12/1991 | European Pat. Off. . |
| 0 577 116 | 6/1993 | European Pat. Off. . |
| 0 667 325 | 8/1995 | European Pat. Off. . |

*Primary Examiner*—Deborah Jones
*Assistant Examiner*—Jason Savage
*Attorney, Agent, or Firm*—Fulbright & Jaworski, LLP

[57] ABSTRACT

A ceramic formed body containing a) 5 to 70 vol % of at least on intermetallic aluminide phase which additionally may contain aluminum or/and aluminum alloy, and b) 30 to 95 vol % of one or more ceramic phases which form a solid interconnecting skeleton and wherein the intermetallic phase or phases consist of predominantly interconnected areas with average sizes of 0.1 to 10 μm, is obtained by sintering, in a non-oxidizing atmosphere, of a powder metallurgically green body which consists of a mixture of finely dispersed powder of aluminum, one or more ceramic substances and maybe further metals such that the mixture contains at least one oxide ceramic or/and metallic powder which, during sintering, reacts with aluminum thereby forming an aluminide and maybe $Al_2O_3$.

55 Claims, 7 Drawing Sheets

45% Al   35% $Al_2O_3$   20% 2Y-TZP

45% Al  35% Al$_2$O$_3$  20% 2Y-TZP sapphire fibers   45% Al   35% Al$_2$O$_3$   20% 2Y-TZP 25% Al    25% Ti    18,2% 2Y-TZP    31,8% $Al_2O_3$ 24% AL  18% Fe  37% $Al_2O_3$  21% 2Y-TZP

PRODUCTION OF AN ALUMINIDE CONTAINING CERAMIC MOULDING

FIELD OF THE INVENTION

The invention relates to a process for making ceramic bodies and the ceramic bodies thus formed.

BACKGROUND AND PRIOR ART

Hard metal (Co bonded WC), developed in the thirties, which had been successful until today in numerous variants due to its good wear resistance, has always been the trigger for experiments to ductilize also non-carbide ceramics with metallic phases. Especially in the sixties during which the term "Cermets" was coined (c.f. e.g. "Structure and Properties of Cermets") Z. Metallkde., 59 (1968) 170) numerous experiments concentrated on oxide ceramics of which a reduction in brittleness would have drastically improved the prospects for increased technical application. The desired advantageous combination of good ductility and fracture toughness of metals with the excellent high temperature properties, the wear resistance and the hardness of ceramics, however, was unsuccessful in most cases. On the contrary, cermets even combined the negative properties of both classes of materials. One cause lies in the typically very bad wetting of oxide ceramics by liquid metals which causes, during liquid phase sintering, the metal phase to sweat out of the body. In order to prevent this, such composite bodies must be hot pressed or hot forged as for instance carried out in the system $Al_2O_3$—Al (UK-Patent 2,070,068A; U.S. Pat. No. 5,077,246). Another cause for the bad mechanical behavior can be sought in the characteristic microstructure of cermets which typically results from a powder metallurgical mixture of the two phases. The ceramic component is mainly embedded in the metallic matrix which often amounts to less than 20 vol % (c.f. e.g. "Processing of $Al_2O_3$/Ni Composites", J. Eur. Ceram. Soc., 10 (1992) 95). In metal bonded carbides or boride cermets the ceramic phase can additionally form a skeleton, however, the metallic properties usually dominate in most cermets ("Cermets", Reinhold Publ. Co., New York, 1960). Today only carbide combinations, especially TiC-Ni, are designated as cermets.

New strengthening concepts for ceramic materials are based on the introduction of a second phase into the ceramic matrix such that the positive properties of the ceramic are essentially retained. Examples are transformation toughenable $ZrO_2$ particles ("Strengthening Strategies for $ZrO_2$-toughened Ceramics at High Temperatures", J. Mat. Sci. Eng., 71 (1985) 23) or SiC whiskers ("TZP Reinforced with SiC Whiskers", J. AM. Ceram. Soc., 69 (1986) 288) in an $Al_2O_3$ matrix. At first, the inclusion of metals was considered unreasonable because, according to conventional composite theories, metals with low yield stress and low modulus of elasticity could not improve brittle ceramics especially with respect to their strength. Admittedly, it has been shown recently that this is not always the case ("Effect of Microstructure on Thermal Shock Resistance of Metal-Reinforced Ceramics", J. Am. Ceram. Soc. 77 (1994) 701 and "Metalle verbessern mechanische Eigenschaften von Keramiken", Spektrum der Wissenschaft, Januar (1993) 107). However, the strengthening effect is only achieved if the microstructure of the classical cermets is reversed, i.e. the ceramic material forms a rigid matrix which is premeated by a monocrystalline metallic phase. The designation "metcers" would in this case constitute a conceptual characterization of the reversal in microstructural components. Quite apart from the modified microstructure of these composites, it is also the significantly smaller quantity of the metal phase which is responsible for the improvement compared to conventional cermets. The metal embedded in the ceramic matrix has considerably better mechanical properties than it does in the "free" state, a phenomenon which seems to apply even for otherwise brittle intermetallic phases ("Metcers—A Strong Variant of Cermets", Cfi/ber. DKG 71 (1994) 301).

So far, a number of different methods have been used to produce these novel metal-ceramic composites, for example the directed oxidation of molten metals (DMO), where an $Al/Al_2O_3$ composite grows on molten aluminum by way of oxidation in air (see e.g. "Formation of Lanxide TM Ceramic Composite Materials", J. Mat. Res. 1 (1986) 81 and "Directed Oxidation of Molten Metals" in: Encyclopedia of Mat. end Eng. (Ed. R. W. Cahn), Supplementary Vol. 2, Peramon, Oxford (1990) 1111). Other practicable methods are pressure-die casting ("Application of the Infiltration Technique to the Manufacture of Cermets", Rep. Dt. Keram. Ges., 48 (1997) 262-8) and the infiltration of porous ceramic preforms with molten metal ("Method for Processing Metal-Reinforced Ceramic Composites", J. Am. Ceram. Soc., 73 [2] 388–393 (1990). Gas-pressure infiltration provides a means of infiltrating non-wetting metals into the ceramic preform (see e.g. "Microstructure and Properties of Metal infiltrated RBSN Composites", J. Eur. Ceram. Soc. 9 (1991) 61–65). The metal is first melted in a vacuum and then, once the infiltration temperature has been reached—usually 100 to 200° C. above the melting point—the ceramic preform is dipped into the molten metal and a gas pressure built up. This technique is also suitable for metals with high melting points, which cannot be infiltrated into the ceramic preform using the conventional pressure-die casting method, but is time-consuming and very expensive.

Another method of producing an $Al_2O_3$ part permeated Al is based on reactive metal infiltration of ceramic preforms containing $SiO_2$ (see e.g. $Al_2O_3$/Al Co—Continuous Ceramic Composite ($C^4$) Materials Produced by Solid/Liquid Displacement Reactions: Processing, Kinetics and Microstructures", Ceram. Eng. Sci. Proc. 15 (1994) 104).

Composite parts containing Al and $Al_2O_3$ can also be produced by means of thermite-based reactions (SHS: Self-Propagating High-Temperature Synthesis). A large number of such reactions have been investigated so far, all of which proceed according to the scheme:

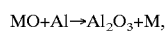

$$MO+Al \rightarrow Al_2O_3+M,$$

where M is a metal and MO the corresponding oxide (see e.g. "Combustion Synthesis of Ceramic and Metal-Matrix Composites", J. Mat. Synth. Proc. 2 (1994) 71 and "Thermodynamic Analysis of Thermite-Based Reactions for Synthesis of Oxide-$B_4C$ Composites", J. Mat. Synth. Proc., 2 (1994) 217 and 227). As a result of the uncontrollable generation of heat (the reaction is highly exothermic) all SHS composites are porous, in homogneous and of coarse microstructure. As a result their strength seldom exceeds 100 MPa, which means their use as structural parts is out of the question.

Research in the field of materials has for a long time pursued the goal of substituting intermetallic compounds for metals in may areas, also in metal-ceramic composites. The intermetallic compounds of Al (aluminides) are especially in demand here due to their low specific weight, good high-temperature stability and their resistance to oxidation (see e.g. "Intermetallic Compounds", Mat. Res. Soc. Proc. Vol. 288, 1993). However, the powder-metallurgical production of aluminides with ceramic phases has up till now been very costly, since, on the one hand, the production of the aluminide powder is very expensive because of the extremely inert conditions required and, on the other hand, the powder can only be fully compacted by means of hot pressing, hot forging, hot extrusion, hot isostatic pressing, or explosive forming (see e.g. "Powder Processing of Intermetallics and Intermetallic Matrix Composites (IMD)" p. 93–124 in Processing and Fabrication of Advanced Materials for High-Temperature Applications—II, ed. V. A. Ravi et al, The Min. Met. Mat. Soc., 1993). Moreover, in all cases the aluminide constitutes the matrix, while the $Al_2O_3$ is dispersed as particulate phase and makes up less than 50% of the volume (see e.g. "A Review of Recent Developments in $Fe_3Al$—Based Alloys", J. Mat. Res. 6 (1991) 1779 and "Powder Processing of High-Temperature Aluminide-Matrix Composites", H-T Ordered Intermetallic Alloys III, 133 (1988) 403). For the production of such composites, use can be made of the reaction heat by having two or more metals react with each other to form the desired aluminide, but in all cases investigated so far this procedure results in coarse and inhomogeneous microstructures, which means that mechanical properties were either not measured at all ("Reactive Sintering Nickel-aluminide to Near Full Density", PMI 20 (1988) 25), or that, in a further step, the preformed part had to be subjected to hot post compaction ("SHS of TiAl—SiC and TiAl—$Al_2O_3$ Intermetallic Composites", J. Mater. Sci. Let., 9 (1990) 432).

All hitherto know forms of composites and the methods of production thereof have characteristic disadvantages. The pressure-die casting technique, for example, is for technical reasons (no suitable pressure-vessel material available) only suitable for Al alloys, not, however, for high-melting-point aluminides. Similar limitations apply to gas-pressure infiltration, where aluminides can only be infiltrated at temperatures far in excess of 1400° C. Moreover, in this case the infiltrated composite part would still have to be machined from the solidified aluminide melt, an extremely tedious procedure and only possible for parts with simple geometry. Reactive-type processes such as DMO and $C^4$ can only be used for $Al_2O_3$ parts with Al alloys containing Si or Mg, i.e. not for alloys containing aluminides. Besides, the reaction velocities are extremely low, averaging only 2 cm/day, which means that the procedure is extremely time-consuming. All powder-metallurgical processes used hitherto have resulted in the disadvantages typical of oxide-ceramic cermets, i.e. without subsequent hot compaction, the microstructure is porous, coarse (microstructural features usually being much larger than 10 $\mu$m) and inhomogeneous, which results in inadequate strength as well as brittleness.

SUMMARY OF THE INVENTION

The object of the present invention is thus to produce $Al_2O_3$/matrix composite bodies which are permeated by aluminides and which, maybe, can contain further metallic and ceramic components and which do not exhibit the disadvantages discussed previously.

This object is achieved according to the invention by a process for making a ceramic body containing a) 5 to 70 vol. % of at least one intermetallic aluminide phase which may contain additional aluminum or/and aluminum alloy and b) 30 to 95 vol. % $Al_2O_3$ and maybe one or more additional ceramic phases where the ceramic phases form a solid interconnected skeleton and the intermetallic phase consists of in average 0.1 to 10 $\mu$m large predominantly interconnected areas, wherein a powder-metallurgically formed green body is sintered in a non-oxidizing atmosphere, where the green body consists of a mixture of a very fine powder of aluminum, one or more ceramic substances and maybe further metals with the intend that at least one oxide ceramic or/and metallic powder is contained in the mixture which reacts with aluminum during sintering thereby forming aluminides and $Al_2O_3$.

In the method according to the invention, aluminum reacts under the conditions stated fully or partially with an oxide and/or a metal to form the desired aluminide and maybe additionally $Al_2O_3$.

The invention is based on the surprising fact that a green body composed of very fine aluminum, $ZrO_2$ and $Al_2O_3$ was sintered in air by rapid introduction into a furnace pre-heated to 1550° C. without breaking into small pieces as expected. Due to the extremely high heating rate of less than 1 second from room temperature to furnace temperature, it was expected, as is the case for conventional ceramic green bodies, that it would fracture into small pieces because of the extreme thermal stresses. Surprisingly, the green body was converted to a completely crackfree body. Further examination showed that, under a thick dense $Al_2O_3$ surface layer, Zr aluminide and $Al_2O_3$ had formed. The porosity, however, was the same as that of the green body because of the dense surface layer which prevented shrinking. By sintering in an oxygen free atmosphere and the thereby caused lower heating rates of 30° C./min, it was possible though to fabricate bodies which shrunk to full density.

DETAILED DESCRIPTION OF PREFERRED EMBODIMENTS

Figure 1:
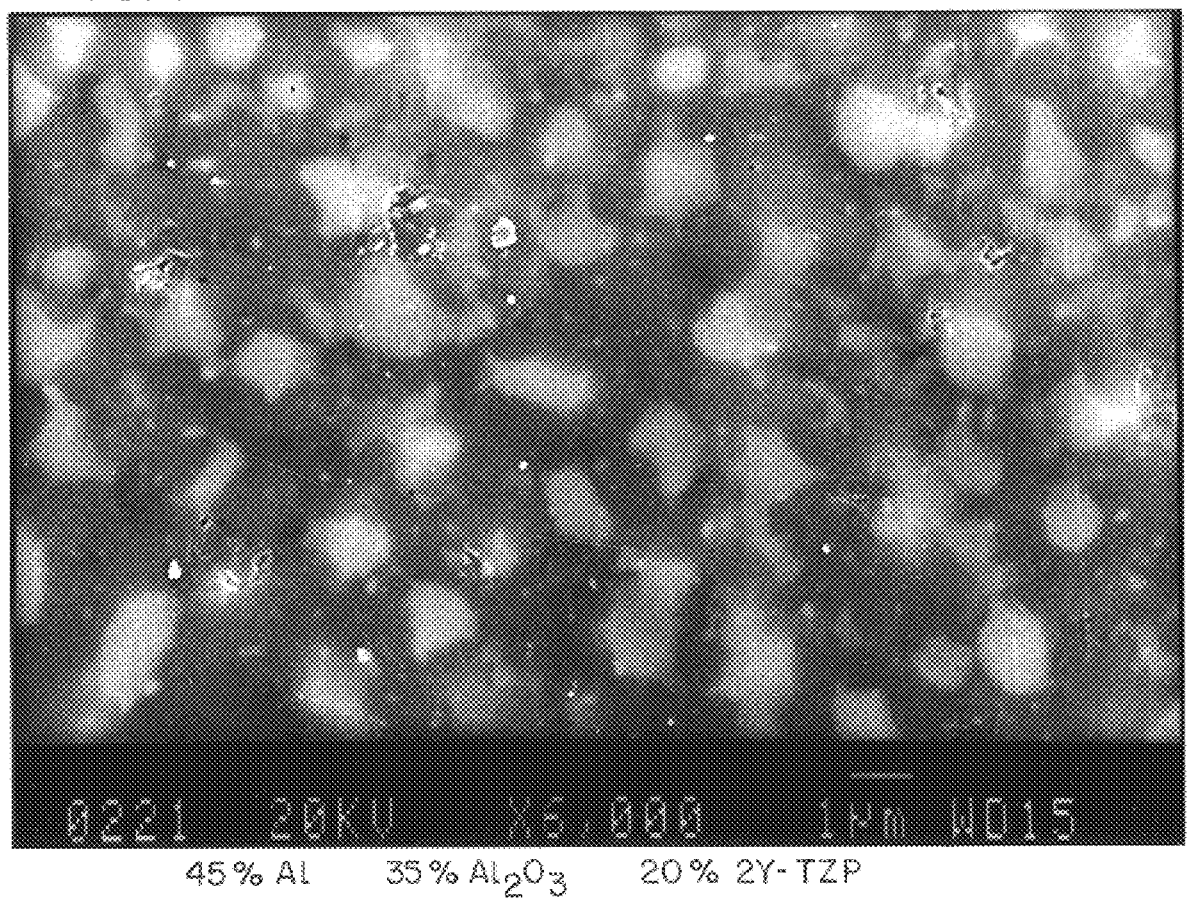
FIG. 1 shows the microstructure obtained in accordance with the invention, via a published cross section obtained from a green body consisting of 45 vol % Al, 20 vol % 2Y-$ZrO_2$, and 35 vol % $Al_2O_3$. The light areas in the figure, which are about 1 um in size, are the intermetallic phase, and the dark areas are $\alpha$-$Al_2O_3$. Electrical resistivity of the body, which is about 1 $\Omega$/cm, shows that the components of the intermetallic phase are interconnected.
Figure 2A:
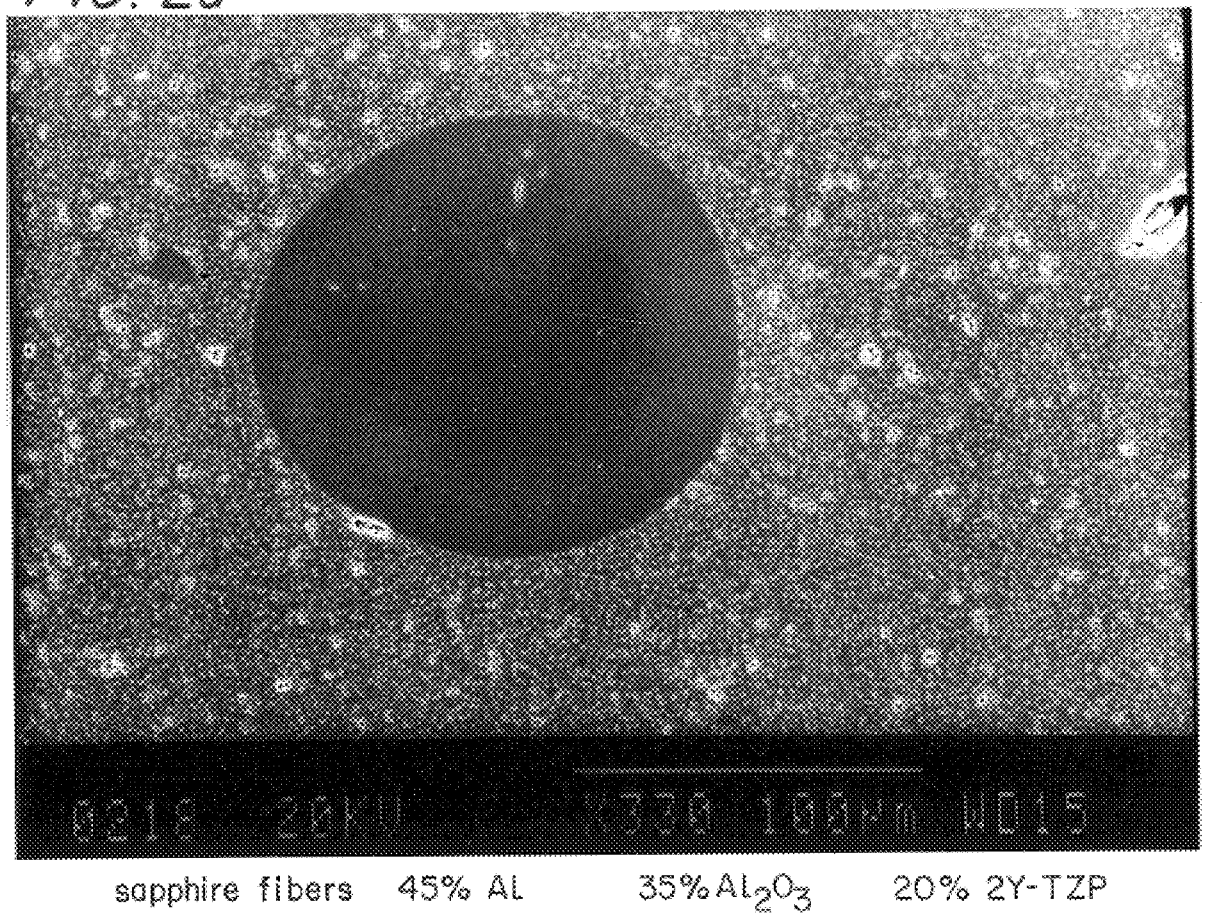
FIGS. 2a and 2b show a cross-section of a body fabricated in the same way to which, however, sapphire fibers (125 $\mu$m in diameter) were added to the powder. The fiber composite body shown in FIGS. 2 and 2a was fabricated by sintering in vacuum for one hour at 1550° C. The magnification of the fiber/matrix interphase demonstrates that perfect sintering around the stiff non-shrinking phase occurred without crack formation.
Figure 2B:
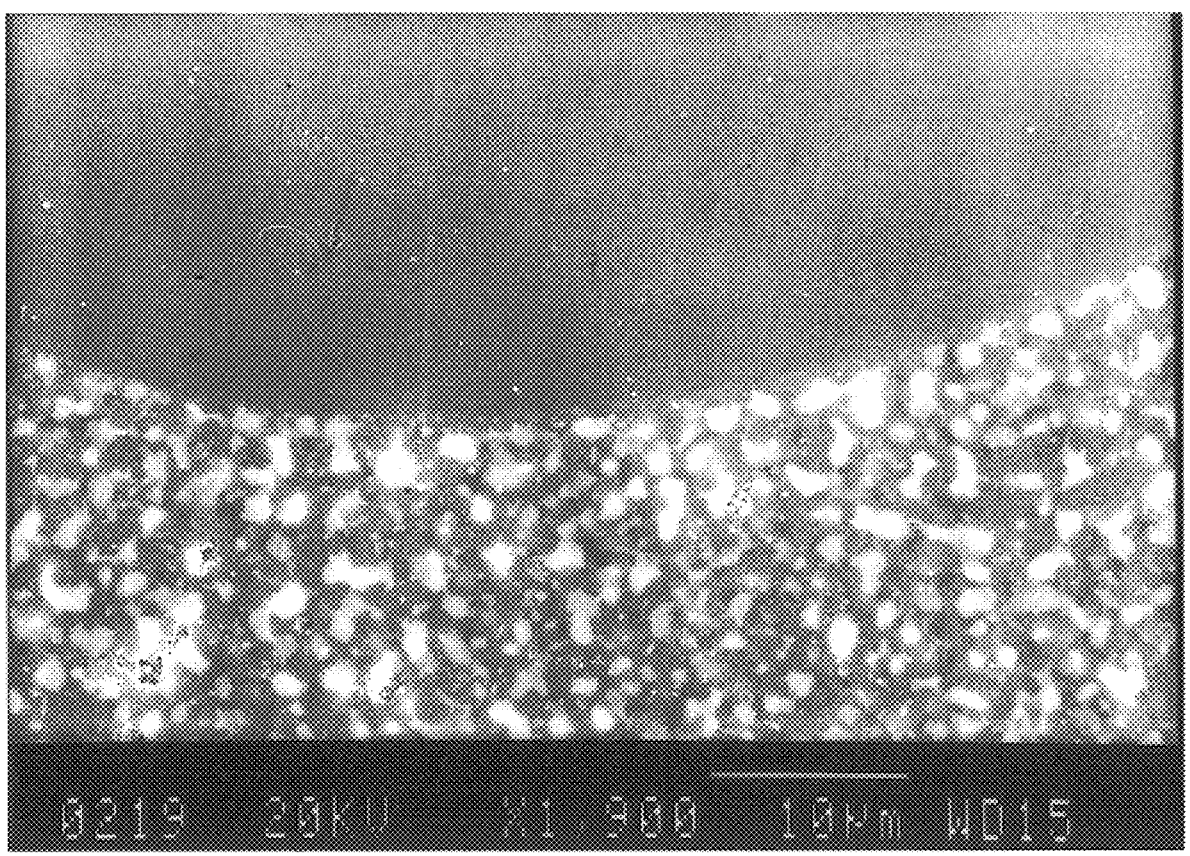

A pre-condition for the surprising properties and the novel microstructure of the ceramic body obtained according to the invention is the existence of very fine powder components in the green body. According to the invention, "very fine" means an average particle size of less 1 $\mu$m and a specific powder surface of at least 5 m$^2$/g. It is of advantage if powder mixtures with a specific surface of 10 to 40 m²/g are used. Even higher specific surfaces are also suitable, however, their processing is unnecessarily time consuming and expensive.

It is of advantage if the composition of the green body is choosen such that the intermetallic and maybe metallic phase makes up 15 to 70 vol. % of the finished composite body. The maximum possible volume fraction of aluminide phase can be obtained from the equation:

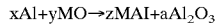

where MO is the oxide ceramic substance of mass y which reacts with the mass x of Al (usually exothermally) to form a mass a of $Al_2O_3$ and the desired aluminide of mass z of MAI. This is examplyfied in the following table (the volume percentages in the reaction sintered product are given in perenthesis).

| xAl | + | yMO | →zMAl (vol. %) | + | $aAl_2O_3$ (vol. %) |
|---|---|---|---|---|---|
| 5 Al | + | 3 FeO | →3 FeAl (67) | + | 1 $Al_2O_3$ (33) |
| 3 Al | + | 3 FeO | →1 $Fe_3Al$ (55) | + | 1 $Al_2O_3$ (45) |
| 8 Al | + | 3 $Fe_2O_3$ | →2 $Fe_3Al$ (45) | + | 1 $Al_2O_3$ (55) |
| 4 Al | + | 1 $Fe_2O_3$ | →2 FeAl (57) | + | 1 $Al_2O_3$ (43) |
| 5 Al | + | 3 TiO | →3 TiAl (70) | + | 1 $Al_2O_3$ (30) |
| 7 Al | + | 3 $TiO_2$ | →3 TiAl (54) | + | 2 $Al_2O_3$ (46) |
| 3 Al | + | 3 TiO | →1 $Ti_3Al$ (60) | + | 1 $Al_2O_3$ (40) |
| 5 Al | + | 3 $TiO_2$ | →1 $Ti_3Al$ (43) | + | 2 $Al_2O_3$ (57) |
| 13 Al | + | 3 $TiO_2$ | →3 $TiAl_3$ (45) | + | 2 $Al_2O_3$ (55) |
| 11 Al | + | 3 TiO | →3 $TiAl_3$ (62) | + | 1 $Al_2O_3$ (38) |
| 28 Al | + | 3 $Nb_2O_5$ | →6 $NbAl_5$ (64) | + | 5 $Al_2O_5$ (36) |

If the amount of the ceramic phase in the final product should be higher than a, additional $Al_2O_3$ and/or further ceramic phases have to be added to the starting powder mixture. It is advantageous to choose the ceramic substances for the powder mixture form the following group: $Al_2O_3$, AlN, $Al_4C_3$, $AlB_2$, C, $Cr_2O_3$, $CrB_2$, $Cr_2Cr_3$, CuO, $Cu_2O$, CoO, $Co_2O_3$, $SiO_2$, $Si_3N_4$, SiC, $Si_xB_y$, $B_4C$, $ZrO_2$, $ZrB_2$, ZrC, ZrN, $HfO_2$, $HfB_2$, HfC, HfN, $Ta_2O_5$, TiO, $TiO_2$, TiN, $TiC$, $TiB_2$, FeO, $Fe_2O_3$, $Fe_3O_4$, $Fe_2C_3$, $FeB_2$, MgO, MnO, $MoO_3$, $Nb_2O_5$, NiO, CaO, $Y_2O_3$, $V_2O_5$, WC, mullite, spinels, zirconates, ilmenite ($FeTiO_3$), zircon ($ZrSiO_4$) or titanates as well as Fe-, Ti-, Co-, Ni-, Zr-, Si-, Nb-containing ores especially zircon (($ZrSiO_4$) or ilmenite ($FeTiO_3$). In the final ceramic body, the same substances can form the ceramic phase.

Except for aluminum, it is advantageous to choose the metallic powder from the group: Au, Ag, B, Ce, Cu, Ca, Cr, Co, Fe, Ge, Hf, K, U, Mo, Mg, Mn, Ni, Ta, Ti, Zn, Zr, Si, Sb, Sn, Y, Sc, W, V.

The combination of oxide ceramic substances and maybe of the metallic powders should be chose such that the following aluminides are obtained by their mutual reaction: TiAl, $TiAl_3$, $Ti_3Al$, $Ni_3Al$, NiAl, $Fe_3Al$, FeAl, $Zr_3Al$, $Ni_2TiAl$, $Fe_3(Al,Si)$, $NbAl_3$, $Nb_3Al$, $TaAl_3$, FeCrAl, $Fe_3AlC$, $Co_2TiAl$, FeTiAl, $Ti_2NbAl$, $Ti_5(Al,Si)_3$. Also TaAl, $Cr_4Al_9$, $Cr_5Al_5$, $Cr_2Al$, $Al_2Zr$, $Al_3Zr$, $Al_3Fe$, $AlNb_2$, $Al_2Ta$, $Al_5Mo_5$, $AlMo_3$, AlMo, AlCo, $Al_3CO$ are considered. One or more of these aluminides, especially $Ni_3Al$, can be added to the powder as nucleation agent.

It is useful to mill the powder mixture for the fabrication of the green body in a liquid organic medium in a ball mill or a similar milling device. It is advantageous to use milling balls made of steel, WC-Co and $Al_2O_3$, the use of $ZrO_3$ (Y-TZP) is especially advantageous.

Alternatively, it is also possible to mill the powder mixture in the dry state in inert atmosphere or in vacuum.

Strengthening or functional elements maybe added to the powder mixture. It is useful if these are present in the form of particles, spheres, platelets, whiskers, fibers, or similar. The volume content of such strengthening additives can be between 5 and 50%. At larger or smaller additions, the properties of the base body can no longer be obtained to the same extend and the desired strengthening effect is small. It is useful if these strengthening and functional elements exhibit diameters between 0.5 and 1000 µm. In this case the excellent mechanical properties of the base body are retained. It is useful if the added elements consist of oxides, carbides, nitrides, borides and/or silicides, especially advantageous are carbon, diamond, SiC, $Al_2O_3$, $Sl_3N_4$, TiC, WC or/and $ZrO_2$. $ZrO_2$ has been shown to be especially suitable for the microstructural development. In a preferred embodiment, the formed body contains 1 to 15 vol. % of $ZrO_2$ in monoclinic and/or tetragonal symmetry.

The as-processed powder mixture can directly, or after a heat treatment at 300 to 500° C., be processed into the green body.

The fabrication of the green body is carried out according to known powder metallurgical methods. Suitable are all so-called P/M-techniques, i.e. uniaxial or isostatic pressing, injection molding, slip casting, extrusion or similar. These techniques are known to the specialist and need not to be further explained.

The sintering of the green body is carried out in a non-oxidizing atmosphere, i.e. especially under exclusion of oxygen. It is advantageous if the green body is sintered in vacuum or in an atmosphere consisting of one or more of the gases $H_2$, $N_2$, Ar or He.

The experiments carried out so far have shown that, in most of the compositions presented in the following examples, the reaction between Al and the oxide substances takes place mainly in the temperature range 350 to 660° C., i.e. below the melting point of Al. Therefore, it is often advantageous to use slower heating rates in this range (1–10 K/min.). It was actually surprising that it is a solid-solid reaction rather than a solid-liquid reaction.

Under the conditions stated, sintering starts already at 1100° C. Though the temperature can be increased up to 1900° C. It is advantageous to use 1350 to 1600° C.

According to the invention, the heating rate of this technique can be high as technically possible. Usually the rate is 1 to 100° C./min, of special advantage 10 to 40° C./min. Under these conditions, sintering can be carried out using conventional and not expensive devices.

Deviating from the above described technique, sintering can also be carried out according to the previously mentioned method in an oxygen containing atmosphere at especially high heating rates.

According to this modification of the invention, the green body is sintered in a furnace pre-heated to 1300 to 1600° C. in air or in an oxygen-containing atmosphere with a heating rate of more than 100° C./min such that a thick oxide layer is formed before the inner part of green body is oxidized.

In order to achieve a sufficiently high density of the above described body, hot isostatic post densification has to be carried out at temperatures between 1200 and 1600° C. at pressures between 50 and 200 MPa. Such post densification treatment can, however, also be applied to bodies which were sintered in a non-oxidizing atmosphere.

A special feature of the ceramic body fabricated according to the invention is the fact that its intermetallic phase is excessable to conventional metallurgical treatments for the improvement of the microstructure which essentially consist of a heat treatment. It is advantageous to heat treat the sintered body in vacuum or in an inert or reducing atmosphere at temperatures between 1000 to 1600° C. for a period of time that is sufficient for the microstructure of the intermetallic or maybe metallic phase to become homogeneous and for the grain size to attain a size that corresponds at least to the average diameter of the intermetallic regions. In other words, the grain size must be coarsened such that it equals at least the size of the interconnected areas of the intermetallic phase, i.e. averaging 0.1 to 10 $\mu$m.

Alloying measurements known from science and technology for the improvement of mechanical properties of intermetallic compounds by adding the respective metal oxides or metals to the starting mixtures can be applied to the composites specified in this invention, e.g. small amounts of Co (CoO) or Ni (NiO) added to intermetcers containing $Fe_3Al$, or adding B and Ni to FeAl, or B to $Ni_3Al$.

According to a further embodiment of the invention, a body sintered under non-oxidizing conditions can, in a second step, be heat treated in an oxygen-containing atmosphere thereby forming an oxide containing especially $Al_2O_3$-containing protective surface layer. A thickness of 1 to 500 $\mu$m of such protective layer is useful. The thickness of the protective layer can be controlled by temperature and duration of the heat treatment and oxidizing atmosphere.

For instance, a green body formed from a powder mixture which was obtained by 8 h attrition milling of 57.1 vol. % $Al_2O_3$, 24.6 vol. % Al, 14.1 vol. % NiO and 4.2 vol. % Ni in n-hexane, was sintered for 1 h at 1550° C. in forming gas (mixture of $H_2$ and $N_2$). The such obtained composite body with microstructural phase sizes of 0.5 to 2 $\mu$m consisted of 57 vol. % $Al_2O_3$ and 43 vol. % $Ni_3Al$ where the $Ni_3Al$ grain size was mostly larger than the $Ni_3Al$ regions between the $Al_2O_3$ regions. Traces of NiAl were observed by XRD. This demonstrates that NiO is fully reduced under these conditions and that $Al_2O_3$ sintered to a dense fine grain-sized (about 1 $\mu$m) matrix. An analogeous mixture without NiO and Ni could not be densified though. The fracture toughness, measured by the indentation crack length (ICL) method, of the $Al_2O_3/Ni_3Al$ composite was 9.5 MPa √m which is about 3 times that of the $Al_2O_3$ matrix alone.

Figure 3:
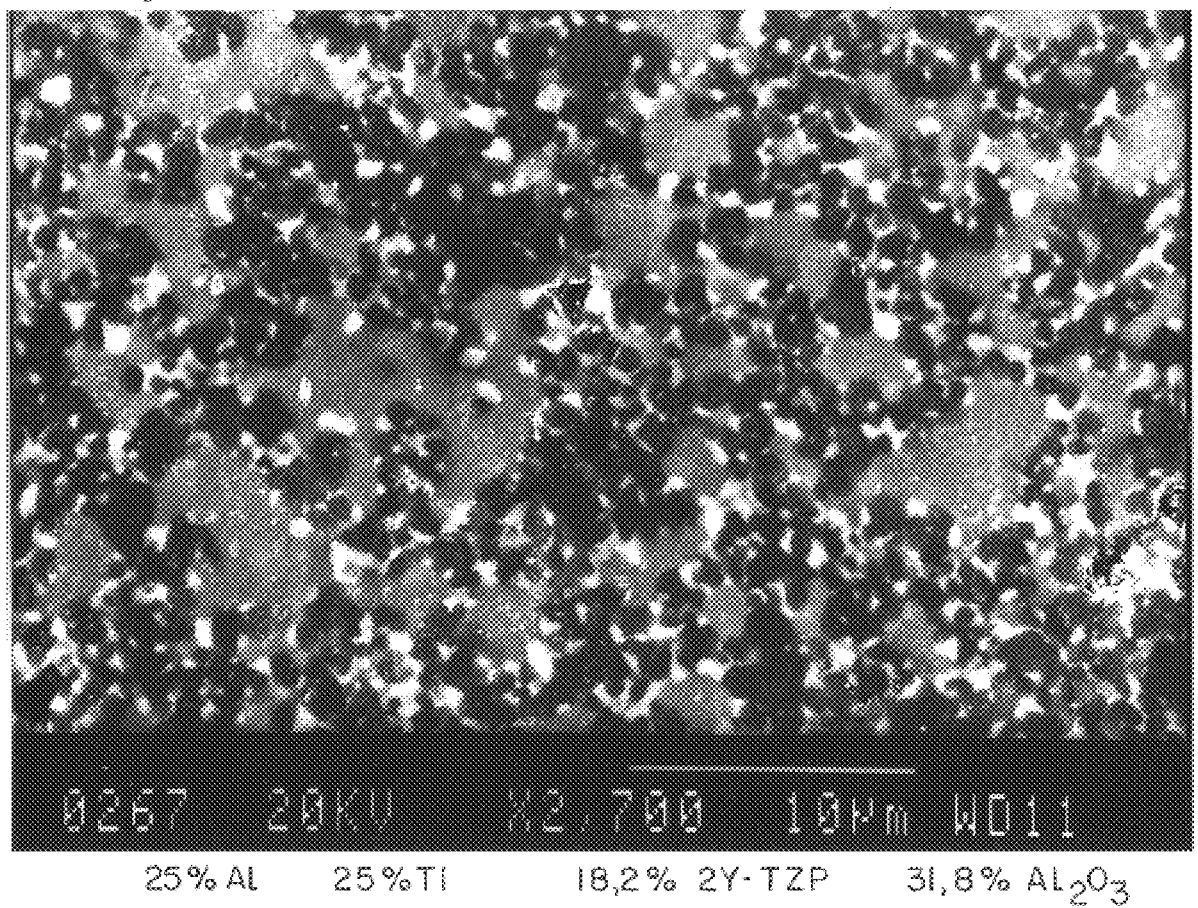
FIG. 3 shows the micrograph of a formed body according to the invention, having a composition as given in the FIG. The ceramic phase of $ZrO_2$ is shown in light color, that of $Al_2O_3$ in dark color and the intermetallic phase in grey color.

The micrograph in FIG. 3 represents the microstructure of a body fabricated in another test according to the invention. For this purpose, 25 vol. % Ti, 18.2 vol. % $ZrO_2$ and 31.8 vol. % $Al_2O_3$ where attrition milled for 10 h in cyclohexane containing 1.5 wt. % of stearic acid using 2 mm $ZrO_2$ balls. The slurry was thereafter spraydried. The dried powder was isostatically pressed at 300 MPa into disks with 50 mm diameter and 10 mm in height. The samples were heated at a rate of 15° C./min in forming gas to 1500° C. with a hold of 2 h. As demonstrated in FIG. 3, the samples were dense and contained as ceramic phase about 10 vol. % $ZrO_2$ (light) and 50 vol. % $Al_2O_3$ (dark) as well as about 40 vol. % of the intermetallic phases $Ti_3Al/TiAl$ and $Zr_3Al$ (grey). FIG. 3 shows the interconnected skeleton of the ceramic and intermetallic phases. The ICL fracture toughness was 6.8 MPa √m and the 4-point bending strength (sample dimensions 40×4×4 $mm^3$) 710 MPa±11%.

Figure 4A:
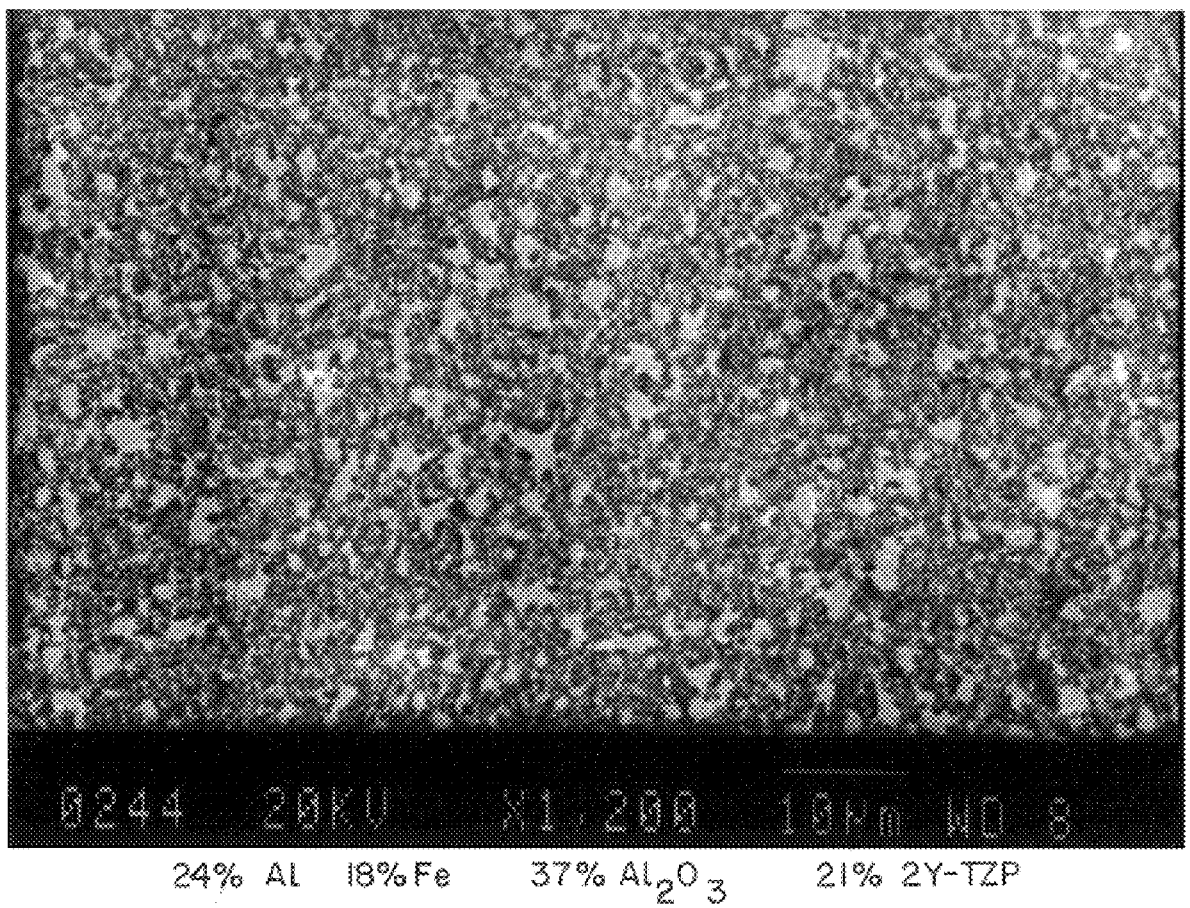
FIGS. 4a and b are micrographs showing the tow interpenetrating network phrases, whereby the ceramic phase is shown in dark color and the intermetallic phase in light color.
Figure 4B:
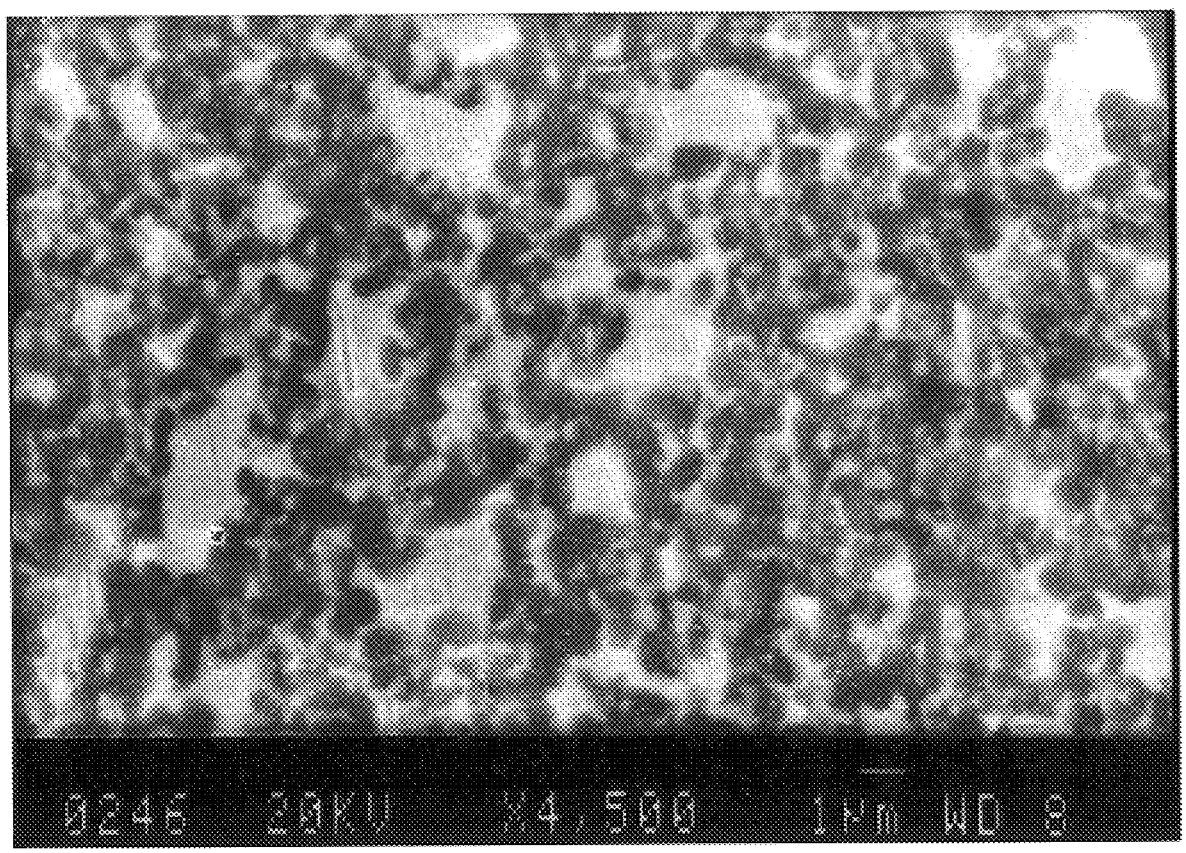
FIG. 4b is shown at greater magnification (4,500 times) than FIG. A.

The interpenetrating networks of the ceramic (dark) and intermetallic phases are also shown in the micrographs of FIGS. 4a and b representing the microstructure of a composite body made of $Al_2O_3/ZrO_2$ and a mixture of the aluminides $Fe_xAl_y$ and $Zr_xAl_y$. The starting powder mixture consisted of 24 vol. % Al, 18 vol. % Fe, 37 vol. % $Al_2O_3$ and 21 vol. % $ZrO_2$. The green body fabricated from this powder mixture was sintered in argon for 1 h at 1550° C. at a heating rate of 30° C./min. The bending strength was 490 MPa and the ICL fracture toughness 11.5 MPa √m. Samples of the same composition sintered in a dilatometer in vacuum showed that shrinkage started at 1180° C. and, already 10 min after reaching the maximum temperature of 1550° C., hardly any further shrinkage took place. The fast and complete sintering is due partially to the finess of the $Al_2O_3$ crystallites which formed during the redox reaction and partially to the effect of a transient Al-containing liquid phase.

Various advantageous features of the invention are obtained both with respect to the processing as to the properties of the fabricated bodies. Especially the following advantages when compared to the state of the art can be obtained:

1. Due to the in situ reduction of cheap oxides (as $TiO_2$, $Fe_2O_3$, $Nb_2O_5$, $ZrO_2$, etc.) and even ores as ilmenite at relatively low temperatures, the method can easily be carried out at very low costs according to the invention.
2. The fast heating rates (as fast as the furnaces may take it, i.e. up to 100° C./min) and the short sintering period allow rapid fabrication of intermetcer components.
3. Complete densification is possible even at temperatures <1350° C. at least by hot isostatic pressing. This implies that, according to the invention, fiber composite bodies infiltrated with an intermetcer slurry can be densified without harming the various fiber types ($Al_2O_3$, SiC, etc.). Even pressureless densification of some compositions is possible by sintering at only 1300° C. in a very short time (1 min.).
4. All problems occuring during powder metallurgical fabrication of aluminides (inert gas milling, $O_2$ take-up, interfacial impurities, etc.) do not take place when fabricating intermetcers according to the invention. Additional sintering aids are not necessary.
5. Due to the high content of ceramic phases, especially of $Al_2O_3$ and maybe reinforcing elements, the typical properties of the intermetcer body fabricated according to the invention are "ceramic". i.e. high temperature resistant, oxidation resistant, hard and wear resistant. Inspite of this fact, the fracture toughness and, to a certain extend, also the bending strength are considerably improved when compared to that of monolithic ceramics as e.g. $Al_2O_3$ (~3.5 MPa √m, ~400 MPa).
6. The interconnected intermetallic phase causes a good thermal conductivity resulting in a good thermal shock resistance. Furthermore, the bodies are electrically conducting, such that electric discharge machining and inductive heating are possible.
7. The grain boundaries of the ceramic matrix, especially that of the $Al_2O_3$ matrix formed during processing according to the invention, are very pure, i.e. $SiO_2$ constituances (impurities) are reduced by Al where Si is incorporated into the lattice of the aluminide. This results in good creep resistance.
8. Intermetcers obtained incording to the invention cannot be fabricated applying other known techniques, at least not in the same quality. Pressure infiltration of molten aluminides (melting pointing above 2000° C.l) into porous preforms are technically feasable, however, associated with a high technical effort which, economically, is not justifiable. Fabrication of similar products by powder metallurgical methods would only be possible if followed by a hot post-densification process. It is doubtful, however, that such products exhibit comparable advantageous properties.
9. Bodies can be fabricated with an electric resistance controllable between 0.1 and $10^3$ $\Omega$ cm by variation of the composition of the constituances.

10. Precursor intermetcer bodies sintered for short periods of time according to the invention, can be superplastically formed because of the fine microstructure (<1 μm), especially concerning the grain size of the $Al_2O_3$ matrix.
11. Bodies which so far were prepared by melt oxidation (Lanxide™) and by the $C^4$-process can now be fabricated in a larger variety and with improved mechanical properties by the method according to the invention.
12. Due to the good oxidation resistance and high temperature strength of alumides, also intermetcers obtained according to the invention exhibit good high temperature properties.
13. Since the aluminide phase exhibits a grain size that is larger than the areas between the ceramic components, the crack bridging aluminide ligaments act mechanically like single crystals, i.e. the typical grain boundary weakness of aluminides cannot come in to play. The ligaments are therefore duktile and exhibit a high yield limit also at high temperatures (see also "Metcers"—A Strong Variant of Cermets", CFI/Ber. DKG 71 (1994) 301).
14. All alloying additives known to improve the mechanical properties including all the respective heat treatments can, with no problem, be applied to control the microstructure of the intermetcers obtained according to the invention.
15. The intermetcers obtained according to the invention represent an ideal matrix for platelet and fiber composites but also for other hard (e.g. diamond) or functional phases.
16. The possibility for creating a dense continuous $Al_2O_3$ protective layer on the surface of intermetcers is of great advantage not only for high-temperature applications but also for frictional applications.
17. Composite intermetcer bodies with very hard components (diamonds, SiC, TiC, WC, etc.) fabricated according to the invention are suitable as cutting tools for machining of metallic but also ceramic and even wooden (or polymer) components.
18. A multilayer embodiment of intermetcers consisting of layers of various compositions or various volume fractions of ceramic phase allow the fabrication of functional gradients.
19. The continuous intermetallic phase of the bodies obtained enables the joining with metallic components at low effort and without metallizing layer, e.g. by frictional welding.
20. Due to the low specific weight of the intermetcers obtained according to the invention (between 4 and 5 g/cm$^3$) respective components, especially as moving parts, are technically of interest.
21. A further advantage is the possibility to use cheap ores, e.g. ilmenite, haematite, magnetite, zircon, chromite, etc. as starting substances for the reaction with Al. In many cases, the impurities contained in the ores either form a solid solution with the $Al_2O_3$ lattice (e.g. $Cr_2O_3$) or they are incorporated in the aluminides formed. Even if the impurities are dispersed as discrete particles in $Al_2O_3$ or in the aluminides, among others also as additional reaction products (e.g. silizides), a composite body may still possess advantageous properties, especially considering the extremely low fabrication costs.

All metallurgical treatments for the improvement of mechanical behavior of aluminides, known from numerous publications, can be applied to the intermetcers obtained according to the invention. This is especially true for alloying elements like Nb, Cr, Zr, V and Mo added to titanium aluminides. The invention thereby opens the way to a new class of composite materials for which exists a large field of applications. This is also true for intermetcers forming the matrix of fiber composites which can be applied as flaw-tolerant, wear and high temperature resistant, oxidation resistant components, e.g. as frictional elements in high-performance breaks. Also moving parts in the high temperature regime of engines and turbines can be made out of intermetcer materials due to the low specific weight. Solid functional materials with precisely controllable electrical resistance can be made according to the invention. This resistance lying between that of metals ($10^{-16}$) and that of ceramics ($10^{10}$ Ωcm) with preference between 0.1 and 1000 Ωcm. A special embodiment can be obtained by a multilayer intermetcers structures in which the content of the intermetallic phase increases from one side to the other (in the direction perpendicular to the layers) which is associated with the respective variation in properties.

With the method according to the invention, a novel high-performance material is made available which, with simple powder metallurgical techniques, is obtained from very cheap raw materials. It can be utilized in many areas and be fabricated with a broad spectrum of properties.

The following examples explain the invention in more detail.

In all examples, it must be considered that, during attrition milling, 10 to 40 wt. % of the Al is transformed to amorphous $Al_2O_3$ and gamma-like $Al_2O_3$ phases by oxidation. These effects of milling are described in detail in "Effect of Processing Parameters on Phase and Microstructure Evolution in RBAO Ceramics" J. Am. Ceram. Soc. 77 (1994) 2509. This oxidizing Al content can be precisely determined such that it can be considered in the desired intermetcer composition.

EXAMPLE 1

100 g of a powder mixture made up of 45 vol. % Al powder (Alcan 105, 20–50 μm diameter, Alcan, Montreal/Canada), 35 vol. % $Al_2O_3$ (MPA 4 Ceralox Condea Chemie, Brunsbüttel, 0.3 μm diameter), 20 vol. % $ZrO_2$ (TZ-2Y, Tosoh, Japan, <1 μm diameter) were ground in a attritor for 7 h with 3 mm TZP milling balls in aceton. The average powder particle size was thereby reduced to about 1 μm. The mixture was subsequently dried and than isostatically pressed at a pressure of 300 to 900 MPa into plates with the dimensions 40×40×8 mm$^3$. Subsequently, the samples were heated in vacuum at 30 K/min to 1550° C. and hold at this temperature for 1 h.

After this treatment, all samples exhibited a density of over 95% TD (theoretical density) with small pores with diameters <1 μm still existing. The bodies consisted of an aluminide mixture $Al_2Zr/Al_3Zr$ with small (diameter <5 μm) areas which were essentially interconnected and embedded in a ceramic matrix consisting of about 70 vol. % $Al_2O_3$ and $ZrO_2$. The shrinkage (linear difference between the dimensions of the green and the sintered body) was 9 and 12% at an isostatic pressure of 900 and 300 MPa, respectively. The average 4-point-bending strength was 470 MPa and the ICL fracture toughness 6.8 MPa √m.

EXAMPLE 2

A mixture of 24 vol. % Al, 18 vol. % Fe (Aldrich, Steinheim, <10 μdiameter), 37 vol. % $Al_2O_3$ and 21 vol. % $ZrO_2$ were attrition milled as in example 1 for 7 h, dried and isostatically pressed at 900 MPa. The samples were subsequently heated in vacuum at 30 K/min to 1550° C. and kept at this temperature for 1 h. The shrinkage was 11.2% at a final density of over 95% TD. The sintered body consisted of about 20 vol. % AlFe and $Fe_3Al$ an 80 vol. % $Al_2O_3$+$ZrO_2$.

EXAMPLE 3

As described in example 1, however using isopropanol instead of aceton, a mixture consisting of 40 vol. % Al, 10 vol. % Nb (Starck, Goslar, <10 μm diameter), 30 vol. % $Al_2O_3$ and 20 vol. % $ZrO_2$ were attrition milled, dried and isopressed at 300 MPa. The samples were subsequently heated in vacuum at 15 K/min to 1550° C. and kept at this temperature for 1 h. The shrinkage was 10.5% at a final density of above 94% TD. The sintered body consisted of about 20 vol. % $AlNb_2$ with traces of $AlNb_3$ and about 80 vol. % $Al_2O_3+ZrO_2$. Die ICL fracture toughness was 5.9 MPa √m.

EXAMPLE 4

As described in example 1, a mixture of 55 vol. % Al, 25 vol. $Al_2O_3$ and 20 vol. % $ZrO_2$ was attrition milled, dried and heat treated in vacuum for 10 min at 500° C. A green density of 58.4% TD was achieved at an isostatic pressure of 400 MPa. The samples were subsequently heated in forming gas at 25 K/min to 1550° C. and kept at this temperature for 2 h. The sintered body had a density of <95% TD and consisted of about 25 vol. % $Al_3Zr+Al_2Zr$ and 75 vol. % $Al_2O_3+ZrO_2$. Die ICL fracture toughness was 6.2 MPa √m. After a 10 min hot isostatic post densification at an argon pressure of 180 MPa and at a temperature of 1450° C., all samples were nearly fully dense; the ICL fracture toughness was increased to 7.6 MPa √m.

EXAMPLE 5

As described in example 1, a mixture of 45 vol. % Al, 20 vol. % TiO, (Riedel-de Haën, Seelze, <100 μm diameter), 15 vol. % $Al_2O_3$ and 20 vol. % $ZrO_2$ were attrition milled, dried and heat treated for 10 min in argon at 500° C. The powder mixture was subsequently isopressed at 900 MPa. The respective bodies exhibited a density of about 95% TD at a shrinkage of a 9.2% after sintering in forming gas at 1450° C. for 2 h. The thus obtained sintered body consisted of the aluminide $AlTi_3$ and $Al_2O_3$ with finely dispersed $ZrO_2$. Traces of $TiO_2$ could also be detected.

EXAMPLE 6

200 g of a mixture made up of 45 vol. % Al, 35 vol. % $Al_2O_3$ and 20 vol. % $TiO_2$ were attrition milled in cyclohexane with 1.7 wt. % stearic acid for 10 h and spray dried. After isopressing at 700 MPa and 1 h sintering in vacuum at 1500° C., bodies with a density of about 95% TD were obtained after a shrinkage of 13.5%. The sintered body consisted of about 35 vol. % essentially $AlTi_3$ and about 65 vol. % $Al_2O_3$. After a hot isostatic post densification (10 min. 180 MPa Ar pressure), the samples were 100% dense and exhibited and ICL fracture toughness of 8.2 MPa √m.

EXAMPLE 7

As described in example 6, a mixture of 20 vol. % Ti (Aldrich, Steinheim, <100 μm diameter), 17 vol. % $Al_2O_3$ and 42 vol. % $ZrO_2$ were attrition milled, dried and heat treated as in example 4. After isostatically pressing at 300 MPa and sintering in vacuum at 1550° C. for 1 h, the final density of the sintered body was about 96% TD at a shrinkage of 15%. The body consisted of >20 vol. % of an $AlTi_3/AlTi$ alloy embedded in $Al_2O_3$ matrix with fractions of $ZrO_2$. Traces of Ti and other phases could be detected by XRD which, could not yet identified.

EXAMPLE 8

As described in example 1, a mixture of 34 vol. % Al, 36 vol. % $Al_2O_3$ were attrition milled, isopressed at 900 MPa and sintered. The shrinkage was 10.3% and the sintered density >94% TD. The body consisted of about 60 vol. % $Al_2O_3$ matrix with finely dispersed interconnected alloy of $AlTi_3/AlTi$. The ICL fracture toughness was 6.9 MPa √m. After a 20 min HIP post densification at 200 MPa Ar pressure, the toughness increased to 7.5 MPa √m.

EXAMPLE 9

As described in example 2, a mixture of 50 vol. % Al, 20 vol. % $Nb_2O_5$ (Johnson Matthey, Karlsruhe, 10–20 μm diameter) and 30 vol. % $Al_2O_3$ was attrition milled, isopressed and sintered. The samples attained a density of about 96% TD at a shrinkage of 12.3%. The sintered body consisted of about 30 vol. % $AlNb_2/AlNb_3$ and about 70 vol. % $Al_2O_3$.

EXAMPLE 10

As described in example 2, a mixture of 60 vol. % Al, 20 vol. TiO (Aldrich, Steinheim, <40 mesh) and 20 vol. % $Al_2O_3$ was attrition milled, isopressed and sintered at 1600° C. for 2 h in forming gas. The samples were nearly full dense and consisted of about 40 vol. % $AlTi_3$ with a small fraction of AlTi as well as about 60 vol. % $Al_2O_3$. The ICL fracture toughness was 7.1 MPa √m and the 4-point-bending strength 640 MPa.

EXAMPLE 11

As described in example 1, a mixture of 50 vol. % Al, 20 vol. % NiO (Aldrich, Steinheim 10–20 μm diameter), and 30 vol. % $Al_2O_3$ was attrition milled, isopressed and sintered. The samples were >95% TD dense and consisted essentially of the aluminide $AlNi_3$ and about 65 vol. % $Al_2O_3$.

EXAMPLE 12

As described in example 2, a mixture of 33 vol. % Al, 10 vol. % Ni (Ventra, Karlsruhe, 1 μm diameter), 1 vol. % Mg and 56 vol. % $Al_2O_3$ was attrition milled, isopressed and sintered. The nearly pore free samples consisted of about 30 vol. % $AlNi/AlNi_3$ and about 70 vol. % $Al_2O_3$. The ICL fracture toughness was 7.5 MPa √m.

EXAMPLE 13

As described in example 1, a mixture of 45 vol. % Al and 35 vol. % $Al_2O_3$ and 20 vol. % of the phase X was mixed, isopressed and sintered. Thereafter, the following phases were detected by XRD:

| 20 vol. % X | matrix | aluminides | other phases |
| --- | --- | --- | --- |
| $Ta_2O_5$ (1) | $Al_2O_3$ | $AlTa_2$ | Ta |
| $V_2O_5$ (2) | $Al_2O_3$ | $alV_2$ | Al |
| 10 vol. % $ZrO_2$ and 10 vol. % Ta (3) | $Al_2O_3$ | $AlTa_2$, $Al_3Zr$ | $ZrO_2$ |
| $MoO_3$ (4) | $Al_2O_3$ | $Al_8Mo_3$ | Mo, Al |
| $HfO_2$ (5) | $Al_2O_3$ | $Al_3Hf$ | Hf |

(1) Aldrich, Steinheim, <5 μm diameter
(2) Aldrich, Steinheim, <10 μm diameter
(3) Johnson Matthey, Karisruhe, <32.5 mesh diameter
(4) Aldrich, Steinheim, 10–20 μm diameter
(5) Aldrich, Steinheim, <1 μm diameter

EXAMPLE 14

As in example 6, a mixture of 45 vol. % Al, 20 vol. % $MoO_3$ and 35 vol. % $ZrO_2$ was attrition milled isopressed and sintered. The samples consisted of about 75 vol. % $Al_2O_3+ZrO_2$ and 25 vol. % of an aluminide mixture of $Al_3Zr$, $Al_8Mo_3$ and phases which were not identified.

EXAMPLE 15

As described in example 1, a mixture of 5 vol. % Al, 30 vol. % Fe, 20 vol. % $ZrO_2$ and 45 vol. % $Al_2O_3$ was attrition milled, uniaxially pressed and sintered. The dense samples consisted thereafter of 55 vol. % $Al_2O_3$, 15 vol. % $ZrO_2$ as well as 30 vol. % AlFe and $Al_2Zr$.

EXAMPLE 16

As described in example 1, a mixture of 24 vol. % Al, 18 vol. % Fe, 58 vol. % $Al_2O_3$, was attrition milled, isopressed and sintered. The samples consisted thereafter of 60 vol. % $Al_2O_3$ and 40 vol. % $AlFe/Al_3Zr$. The ICL fracture toughness was 11.5 MPa √m and the 4-point-bending strength 510 MPa at a shrinkage of less than 15%.

EXAMPLE 17

As described in example 1, a mixture of 50 vol. % Al, and 50 vol. % $ZrO_2$ was attrition milled, isopressed and sintered. The density was about 96% TD at a shrinkage of 12%. The sintered body consisted of about 30 vol. % $Al_2Zr$ as well as $ZrO_2$ and $Al_2O_3$ as matrix. Further intermetallic phases with a volume percentage of about 10 vol. % could not be clearly identified.

EXAMPLE 18

The material from example 1 was used as a matrix for 20 vol. % 10 μm diamond particles (De Beers, Johannesburg, South Africa). These diamond particles were admix after the attrition process as explained in example 1 for 10 min. Thereafter, the composite mixture was dried in a Rotovap dryer and isopressed at 600 MPa into cylinders 10 mm in diameter an 10 mm in height. These were heated in vacuum at 30 K/min to 1400° C. and kept at this temperature for 30 min. Thereafter, the samples were gas tight (about 94% TD) such that they could be post densified by hot isostatic pressing at 1400° C. at an Ar pressure of 200 MPa for 15 min. After this treatment, the composite sample was dense and the diamond particles were incorporated into the material of example 1 without noticeable reaction.

EXAMPLE 19

The material of example 5, attrition milled according to example 6, was used as a slip which was cast into a plaster of paris form containing mullite fibers (Sumitomo Chem., Altex 2K) and than dried; the resulting plates had dimensions 30×30×10 $mm^3$ and contained about 10 vol. % of mullite fibers. The squared plates were than isostatically post densified at 200 MPa. The process was subsequently continued according to example 18. The microstructure corresponded to that of material from example 5, however, with mullite fibers which were not attacked by Al.

EXAMPLE 20

100 g of a mixture of 50 vol. % Al, 10 vol. % $SiO_2$ (Aldrich, Steinheim, <325 mesh diameter), 15 vol. % $TiO_2$ and 5 vol. % $ZrO_2$ and 20 vol. % $Al_2O_3$ was attrition milled in n-hexane for 4 h with 2 steel balls in a UHMWPE-lined vessel. The powder mixture dried in a Rotovap device was isopressed at 300 MPa and subsequently sintered for 1 h at 1550° C. in vacuum. The nearly dense samples consisted of 70 vol. % $Al_2O_3$ (+$ZrO_2$) and 30 vol. % $Ti_5$ (Al, $Si)_3$ including some other phases which have not been identified yet.

EXAMPLE 21

All samples from examples 1 to 17 were annealed in air for 6 h at 1350° C. After this treatment, all exhibited a dense about 100 μm thick layer consisting essentially of $Al_2O_3$.

EXAMPLE 22

100 g of a mixture of 40 vol. % fine Al powder (Inst. of Materials Research, Riga, Latvia, about 1 μm diameter) and 30 vol. % $ZrO_2$ and 30 vol. % $Al_2O_3$ was dry mixed for 24 h in a 1000 $cm^3$ PVC bottle with 5 mm $Al_2O_3$ milling balls. The powder was isopressed at 900 MPa into cylinders 1 mm in diameter and 1 mm in height which were subsequently sintered for 1 h at 1550° C. in vacuum. The samples were about 94% TD dense and consisted of about 80 vol. % (+$ZrO_2$) and about 20 vol. % $Al_3Zr$.

EXAMPLE 23

An additional 5 vol. % of very fine carbon black (Goodfellow, Bad Nauheim <2 μm) was admixed to the mixture of example 1; otherwise the procedure corresponded to that of example 1 (isopressed at 900 MPa). The microstructure was like that of example 1 except that traces of $Al_4C_3$, finely dispersed in the aluminide, were detected.

EXAMPLE 24

As described in example 1, a mixture of 45 vol. % Al, 20 vol. % NiO, 5 vol. % $Ni_{79}Al_{21}$, (Goodfellow, Bad Nauheim, <150 μm), 20 vol. % $Al_2O_3$ and 10 vol. % monoclinic $ZrO_2$ (Dynamit Nobel AG, Hamburg) Dynazircon F 0.7 μm diameter) was attrition milled, dried and isopressed at 900 MPa and sintered. The microstructure consisted of 65 vol. % $Al_2O_3$ and mainly $Ni_3Al$ as well as non-identifiable Zr-containing phases.

EXAMPLE 25

To the material of example 1, 10 vol. % SiC platelets (Alcan, C-Axis, Canada, about 12 μm in diameter) and 10 vol. % $TiB_2$ (H. C. Starck, Goslar, about 10 μm in diameter) were admixed according to example 18. The dried powder mixture was isopressed at 600 MPa and sintered in Ar for 2 h at 1550° C. Thereafter, the $TiB_2$ particles were homogeneously dispersed in the intermetcer material. No microcracks could be detected adjacent to these particles. The SiC platelets were partially desolved.

EXAMPLE 26

30 vol. % WC (H. C. Starck, Goslar, 1.5 μm in diameter) was admixed to the material of example 12 according to the example 25 and sintered according to example 25, however, in $H_2$. The sintered material was about 95% TD dense and contained fine (<2 μm) pores and exhibited an ICL-fracture toughness of 8.3 MPa √m.

EXAMPLE 27

As described in example 1, a powder mixture of Al, $Al_2O_3$ and $ZrO_2$ was attrition milled for 7 h and dried. The powder was subsequently filled into Al sleeve (outer diameter 48 mm, inner diameter 30 mm, length 100 mm closed on one side) and pre-densified on a viberatory table. The sleeve were subsequently extruded at a pressure of 2 GPa. After extrusion, the Al coating resulting from the sleeves was taken off. The such processed samples exhibited a density of >92% TD. Than the samples were heated in vacuum at 30 K/min to 1550° C. and kept at this temperature for 1 h.

These samples exhibited a density of >97% TD; the shrinkage was about 2%. The samples consisted of an aluminide mixture of $Al_2Zr/Al_3Zr$ and of $Al_2O_3/ZrO_2$ as ceramic phase. The microstructure showed an interconnected network of intermetallic and ceramic phases.

EXAMPLE 28

Samples were extruded as in example 27, however, instead of the room temperature densification at high pressure, densification was carried at 450° C. at a pressure of about 700 MPa. The samples were nearly fully dense. The samples were subsequently heat treated as in example 27. Again, a mixture of $Al/Al_2Zr/Al_3Zr$ as metallic and $Al_2O_3/ZrO_2$ as ceramic was formed. A shrinkage was hardly detectable.

EXAMPLE 29

As in example 1, a mixture of 45 vol. % Al, 20 vol. % ilmenite ($FeTiO_3$ Australian Consolidated Rutile Pty, <100 μm diameter) and 35 vol. % $Al_2O_3$, was attrition milled for 7 h, dried and isopressed at 900 MPa. The samples were subsequently heated in vacuum at 15 K/min to 1550° C. and kept at this temperature for 1 h. The shrinkage was 9.8% and the final density above 95% TD. The microstructure consisted of 65 vol. % $Al_2O_3$, about 20 vol. % AlFe and $Fe_3Al$. Further 15 vol. % of Ti- and Fe-intermetallic phases could not yet be clearly identified.

EXAMPLE 30

The ilmenite of example 29 was replaced by 20 vol. % by zircon ($ZrSiO_4$), (Westralian Sands Ltd. Capel, Australia, <10 μm). After reaction sintering, the samples also consisted of about 85 vol. % $Al_2O_3$, 5 vol. % $ZrO_2$ as well as a mixture of $Zr_2Al$ and further phases which were not identified.

EXAMPLE 31

As in example 2, a mixture of 7.4 g Al, 16.1 g Fe and 26.5 g $Al_2O_3$, was attrition milled for 8 h, dried and isopressed at 300 MPa. The samples were subsequently heated at 30 K/min to 1550° C. and kept at this temperature for 1 h. The shrinkage was about 12% and the density 96.5% TD. The body consisted of about 20 vol. % FeAl and about 80 vol. % $Al_2O_3$ with finely dispersed $ZrO_2$ particles with diameters between 20 and 80 nm.

EXAMPLE 32

189 g al and 239.7 g $Al_2O_3$ were attrition milled as in example 1 spray dried in $N_2$ and uniaxial pressed at 50 MPa into disks with dimensions 30 mm diameter and 8 mm in height; these disks were isostatically post densified at 900 MPa. One part of the samples was heat treated as in example 2.

The samples exhibited a density of about 95% TD (with respect to TiAl and $Al_2O_3$) with a phase composition of about 50 vol. % $Al_2O_3$ (including $ZrO_2$ particles) and about 50 vol. % mainly TiA.

The other part of the green samples was heated in vacuum at 30 K/min to 400° C. and then at 10 K/min to 700° C., thereafter at 50 K/min to 1550° C. and kept at this temperature for 1 h. The phase composition was similar to that of the samples from the first part, the density, however, was 99% TD. The bending strength determined strength determined in the punch-on-three-balls test was 690 MPa.

EXAMPLE 33

The samples from the second serie from example 31 were heated from 700 to 1300° C. at 30 K/min and kept there for only 1 min (density above 92% TD). These samples were inductiveley heated in Ar at a frequency of 300 KHz between 1400 and 1500° C. and superplastically formed at this temperature at a pressure of 50 MPa using $Si_3N_4$ dies. Thereafter, the density was nearly 100% TD. The punch-on-three-ball strength was above 900 MPa.

EXAMPLE 34

Samples from example 1 isopressed into plates at 300 MPa were ultrasonically green machined using copper profiles in a suspension of $B_4C$ and cyclohexane; this produced straight-through holes with a diameter of 5 mm as well as squared depressions with dimensions 10 by 10 mm and a depth of 4 mm with smooth inner surfaces. The machined samples were subsequently reaction sintered as in example 1.

EXAMPLE 35

A mixture of 5.3 g Al (Eckert-Werke, Nürnberg), 16.5 g $Fe_2O_3$ (Aldrich, Steinheim), 12.1 g $Al_2O_3$ (Ceralox) and 10.6 g $2Y-ZrO_2$ (Tosoh, Tokyo) was attrition milled as in example 1, dried and isopressed at 900 MPa. The rectangular samples (4×4×40 mm$^3$) were subsequently heated in vacuum at 30 K/min to 1330° C. and kept at this temperature for 1 min. The reaction sintered samples consisted of about 15 vol. % predominantly FeAl and about 75 vol. % $Al_2O_3$ with finely dispersed 10 to 15 nm tetragonal $ZrO_2$ particles. Surprisingly, the density was above 99% TD considering the density of AlFe and an amount of 3 wt. % $t-ZrO_2$ within the $Al_2O_3$ grains.

EXAMPLE 35

A powder mixture made up of 5.3 g Al, 41.5 g $Fe_2O_3$, 12.1 g $Al_2O_3$ and 10.6 g $2Y-ZrO_2$ was attrition milled as in example 34 isopressed and heat treated. Also in this case, the density was above 99% TD with a phase composition of about 15 vol.% predominantly $Fe_3Al$ and about 75 vol. % $Al_2O_3$ (considering the density of $Fe_3Al$ and again 3 wt. % $t-ZrO_2$ within $Al_2O_3$ grains).

EXAMPLE 36

Figure 5:
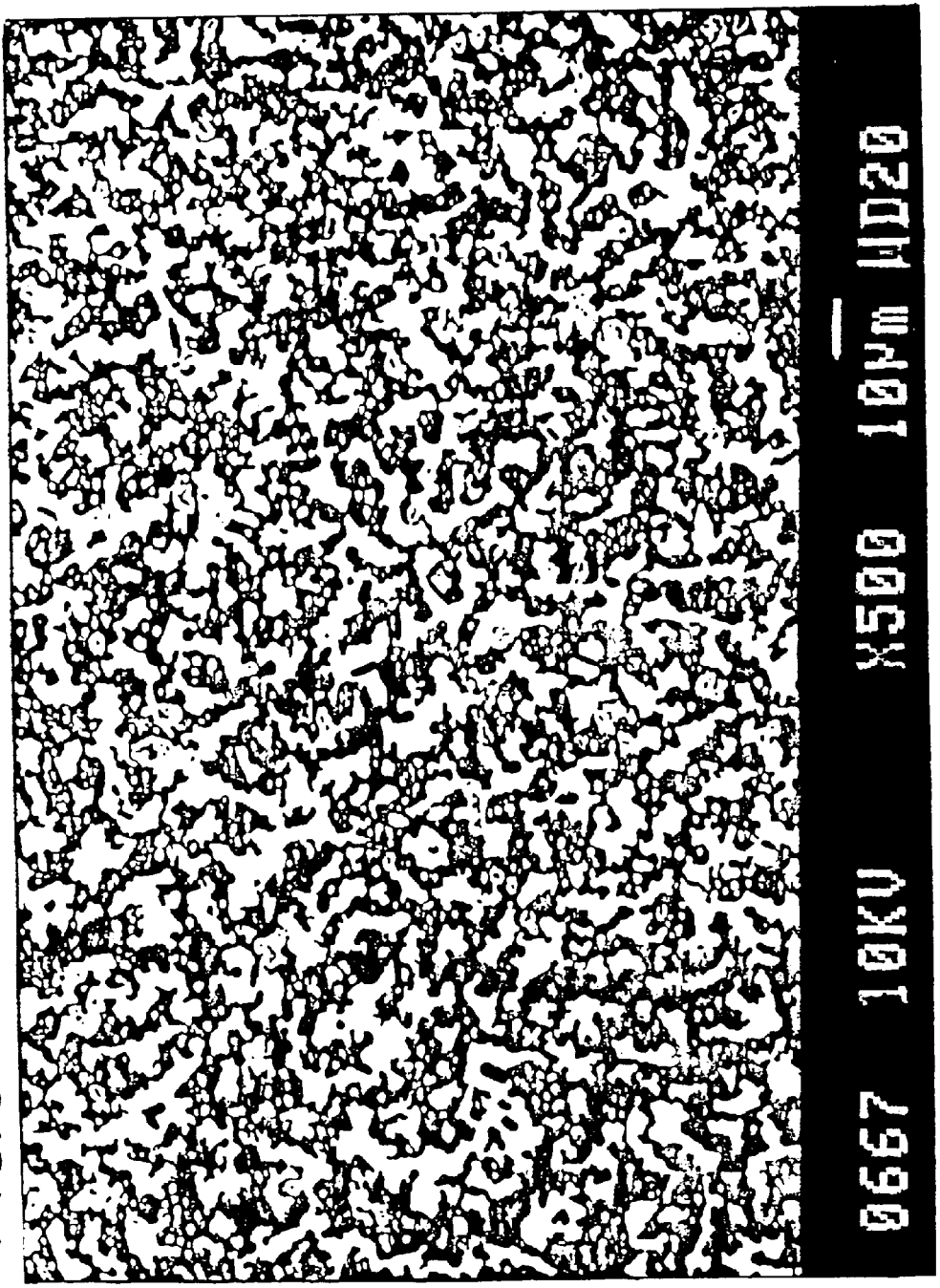
FIG. 5 is a micrograph of the microstructure of the formed body of Example 36.

26.0 g Al and 29.2 g monoclinic $ZrO_2$ (Dynamit Nobel, as in example 24) were attrition milled as in example 1 and isopressed into cylindrical samples (10 mm high, 10 mm in diameter) at 900 MPa. The samples were subsequently heated in vacuum at 30 K/min to 350° C., than at 1 K/min to 700° C. and finally at 30 K/min to 1550° C. and kept there for 1 h. The samples exhibited a density of above 98% TD and consisted of about 50 vol. % predominantly $ZrAl_3$ and about 50 vol. % $Al_2O_3$. FIG. 5 shows a lightoptical micrograph of the sample (×1000).

EXAMPLE 37

As in example 36, a mass of a) 21 g Al and 29 g $ZrO_2$ and b) 17 g Al and 33 g $ZrO_2$ was mixed, isopressed and heat treated. The density was in all cases about 98% TD and the phase composition was a) about 50 vol. % $ZrAl_2$ and about 50 vol. % $Al_2O_3$ and b) about 50 vol. % ZrAl and about 50 vol. % $Al_2O_3$.

EXAMPLE 38

As in example 36 a mass of a) 24 g Al and 26 g $Nb_2O_5$ (as in example 9) and b) 26 g Al and 24 g $Nb_2O_5$ was attrition milled, isopressed and subsequently heated at 30 K/min. to 200° C., than at 5 K/min to 660° C. and at 30 K/min to 1500° C. and kept at this temperature for 30 min. The density of all samples was then above 95% TD. The composition of a) was about 50 vol. % predominantly $NbAl_3$ and that of b) about 40 vol. % $NbAl_3$, the rest being made up of $Al_2O_3$ with finely dispersed $ZrO_2$ particles.

EXAMPLE 39

As in example 38, 30 g Al, 26 g $Nb_2O_3$, 4 g $Cr_2O_3$, 0.5 g $SiO_2$ and 0.5 g $Y_2O_3$ was attrition milled, isopressed and heat treated, however, kept at 1600° C. for 1 h. The samples having a density of above 96% TD were oxidized in air for 100 h at 1300° C. Thereafter, the samples exhibited a thin (about 100 μm) and dense white coating of $Al_2O_3$; the coating did hardly change even when further treated under identical conditions for another 200 h.

We claim:

1. A process for making a ceramic formed body which contains from 5 to 70 vol % of at least one intermetallic aluminide phase and 30 to 95 vol % of at least one ceramic phase, which is in the form of a solid, continuous skeleton, and said intermetallic phase consists, predominantly of interconnected areas having an average diameter of from 0.1 μm to 10 μm, comprising sintering a powder metallurgically formed green body which comprises a mixture of a finely dispersed aluminum powder and at least one finely dispersed ceramic material wherein the powder mixture has an average particle size of less than 1 μm and a specific surface of at least 5 m²/g, in a non-oxidizing atmosphere.

2. The process according to claim 1 wherein said intermetallic phase comprises 15 to 55 vol % of said ceramic formed body.

3. The process according to claim 1, wherein the ceramic phase comprises 35 to 85 vol % of said ceramic formed body, and is $Al_2O_3$.

4. The process according to claim 1, wherein said at least one ceramic material is selected from the group consisting of CaO, $Cr_2O_3$, CuO, $Cu_2O$, CoO, $Co_2O_3$, FeO, $Fe_2O_3$, $Fe_3O_4$, $HfO_2$, $Li_2O$, MnO, MgO, $MoO_3$, $Na_2O$, $Nb_2O$, $Nb_2O_5$, NiO, $SiO_2$, TiO, $TiO_2$, $V_2O_5$, $WO_3$, $Y_2O_3$ and $ZrO_2$.

5. The process according to claim 1, further comprising adding at least one aluminide to said mixture to act as a nucleating agent, wherein said at least one aluminide is selected from the group consisting of TiAl, $TiAl_3$, $Ti_3Al$, $Ni_3Al$, NiAl, $Fe_3Al$, FeAl, $Zr_3Al$, $Ni_2TiAl$, $Fe_3(Al_1Si)$, $NbAl_3$, $Nb_3Al$, $TaAl_3$, $Ta_3Al$, FeCrAl, $Fe_3AlC$, $Co_2TiAl$, FeTiAl, $Ti_2NbAl$, and $Ti_5(Al, Si)_3$.

6. The process according to claim 1 further comprising combining a mass x of Al with a mass y of an oxide of formula MO where M is a metal to form said intermetallic aluminide phase MAl of maximum mass z according to formula $xAl+yMO \rightarrow zMAl+aAl_2O_3$.

7. The process according to claim 1 further comprising mixing said mixture and grinding said mixture in a ball mill for a period of time sufficient to have specific surface at least 5 m²/g.

8. The process according to claim 7, comprising grinding said mixture for a time sufficient to have a specific surface between 10 and 40 m²/g.

9. The process according to claim 7, comprising grinding said mixture in a liquid organic medium.

10. The process according to claim 7, comprising grinding said mixture without liquid in an inert atmosphere.

11. The process according to claim 7, wherein said ball mill comprises milling balls made of steel, WC—Co, $Al_2O_3$, or $ZrO_2$ (Y-TZP).

12. The process according to claim 7 comprising annealing said mixture at a temperature of from 300° C. to 500° C. in an inert atmosphere before forming said ceramic formed body.

13. The process of claim 7, comprising grinding said mixture without liquid, in a vacuum.

14. The process according to claim 1 further comprising adding to said green body a strengthening or functional element in a form selected from the group consisting of a particle, a sphere, a platelet, a whisker and a fiber.

15. The process according to claim 14, comprising adding from 5 vol % to 50 vol % strengthening or functional elements based on the ceramic body.

16. The process according to claim 14 wherein said strengthening or functional elements have a diameter between 0.5 μm and 1000 μm.

17. The process according to claim 14 wherein said strengthening of functional element is selected from the group consisting of an oxide, a carbide, a nitride, a boride, and a silizide.

18. The process of claim 14 wherein the strengthening or functional elements are selected from the group consisting of carbon, diamine, Sic, $Al_2O_3$, $Si_3N_4$, TiC, WC and $ZrO_2$.

19. The process of claim 1, comprising forming said green body by uniaxial pressing, isostatic pressing, slipcasting, injection molding, or extrusion.

20. The process according to claim 1, comprising forming said green body by sintering in a vacuum.

21. The process according to claim 20, comprising sintering at a temperature of 1100° C. to 1900° C.

22. The process of claim 21 comprising heating said green body from room temperature to a temperature of from 200° C. to 400° C. at a rate of 10 to 100° C./minute, then to a temperature of 600° C. to 750° C. at a rate of 1 to 10° C./min, and then at a rate of 10° C./minute to the sintering temperature.

23. The process of claim 22, further comprising inductively sintering said green body to full density after reaching a temperature of from 900° C. to 1300° C.

24. The process of claim 20 comprising sintering said green body at a heating rate of from 1 to 100° C./minute.

25. The process of claim 20 comprising inductively sintering said green body.

26. The process of claim 20 further comprising sintering said green body to 900° C. to 1600° C., and inductively heating said green body to a temperature between 1300° C. and 1700° C. to form a superplastic, said heating being carried out in a die, or in a free standing form.

27. The process of claim 1, wherein said intermetallic aluminide phase further comprises at least one of aluminum, or an aluminum alloy.

28. The process of claim 1, wherein said green body further comprises at least one oxide ceramic.

29. The process of claim 1, wherein said green body further comprises at least one metallic powder, wherein said metallic powder is not aluminum powder.

30. The process according to claim 29 wherein said at least one metallic powder is a powder selected from the group consisting of Au, Ag, B, Ce, Cu, Ca, Cr, Co, Fe, Ge, Hf, K, U, Mo, Mg, Mn, Ni, Ta, Ti, Zn, Zr, Si, Sb, Sn, Y, Sc, W and V.

31. The process of claim 1, wherein said ceramic phase comprises $Al_2O_3$.

32. The process of claim 31, comprising sintering at a temperature of 1350° C. to 1600° C.

33. The process of claim 1, wherein said at least one ceramic material is a mullite, a spinel, a zirconate, or a titanate.

34. The process of claim 1, wherein said at least one ceramic material is an ore of Fe, Ti, Co, Ni, Zr, Si or Nb.

35. The process of claim 34, wherein said at least one ceramic material is $ZrSiO_4$ or $FeTiO_3$.

36. The process of claim 1, further comprising sintering said green body in an atmosphere which consists of one or more of $H_2$, $N_2$, Ar, and He.

37. The process of claim 36, comprising sintering at a temperature of 1100° C. to 1900° C.

38. The process of claim 37, comprising sintering at a temperature of 1350° C. to 1600° C.

39. The process of claim 37, further comprising sintering said green body by heating said green body from room temperature to a temperature of from 200° C. to 400° C. at a rate of 10 to 100° C./minute, and then to a temperature of 600° C. to 750° C. at a rate of 1 to 10° C./minute, and then at a rate of 10 to 100° C./minute to the sintering temperature.

40. The process of claim 39, further comprising inductively sintering said green body after reaching a sintering temperature of 900° C. to 1300° C.

41. The process of claim 36, comprising inductively sintering said green body.

42. The further process of claim 36 comprising sintering said green body at a rate of 1 to 100° C./minute.

43. The process of claim 36, further comprising sintering said green body to 900° C. to 1600° C., and inductively heating said green body to a temperature of 1300° C. to 1700° C. to form a superplastic, said heating being carried out in a die or in free standing form.

44. The process of claim 1, further comprising prior to sintering, heating said formed green body in air, in a furnace preheated to 1300° C. to 1600° C., at a heating rate greater than 100° C./minute, to form a dense surface oxide layer prior to oxidizing the interior of said formed green body.

45. The process of claim 1, further comprising after sintering, heating said formed green body following sintering, in an oxygen containing atmosphere at a temperature of from 1000° C. to 1600° C. to form an $Al_2O_3$ containing surface protective layer.

46. The process of claim 1, further comprising hot isostatically post densifying said sintered body at a temperature of from 1200° C. to 1600° C., at a pressure of 50 MPa to 200 MPa.

47. The process of claim 1, further comprising annealing said sintered body, in an inert atmosphere or a reducing atmosphere at temperature of from 1000° C. to 1600° C. to form a homogeneous intermetallic phase microstructure with a grain size which is at least the size of average diameter of intermetallic phase.

48. The process of claim 47, further comprising annealing said sintered body to form a homogeneous metallic phase microstructure with a grain size which is at least the size of average diameter of metallic phase.

49. A ceramic formed body which comprises from 5 to 70 vol % of at least one intermetallic aluminide phase, and from 30 to 95 vol % of at least one ceramic phase wherein said at least one ceramic phase forms a solid, interconnected skeleton, and said at least one intermetallic phase contains interconnected areas of an average size of from 0.1 to 10 $\mu$m, said ceramic formed body being obtained by sintering, in a non-oxidizing atmosphere, a powder metallurgically formed green body which comprises of a finely dispersed powder mixture of Al and at least one ceramic substance wherein the powder mixture has an average particle size of less than 1 $\mu$m and a specific surface of at least 5 $m^2$/g.

50. The ceramic formed body of claim 49, wherein said intermetallic aluminide phase further comprises aluminum or an aluminum alloy.

51. The ceramic formed body of claim 49, further comprising at least one non-aluminum metal powder.

52. The ceramic formed body of claim 49, comprising at least one aluminide selected from the group consisting of TiAl, $TiAl_3$, $Ni_3Al$, NiAl, $Fe_3Al$, FeAl, $Zr_3Al$, $Ni_2TiAl$, $Fe_3(Al, Si)$, $NbAl_3$, $Nb_3Al$, $TaAl_3$, $Ta_3Al$, FeCrAl, $Fe_3AlC$, $Co_2TiAl$, FeTiAl, $Ti_2NbAl$, $Ti_5(Al_1Si)_3$, $Ti_3Al$, $TiAl_2$, $Ni_5Al_3$, $Ni_2Al_3$, $NiAl_3$, $FeAl_2$, $Fe_2Al_3$, $FeAl_3$, $Nb_2Al$, ZrAl, $ZrAl_2$, $ZrAl_3$, and CoAl.

53. The ceramic formed body of claim 49, wherein said ceramic phase comprises $Al_2O_3$.

54. The ceramic formed body of claim 53, wherein said ceramic phase further comprises an oxide, a carbide, a nitride, a boride, or a silicide.

55. The ceramic formed body of claim 49, further comprising from 1 to 15 vol % of $ZrO_2$, in monoclinic or tetragonal symmetry.

* * * * *

UNITED STATES PATENT AND TRADEMARK OFFICE
CERTIFICATE OF CORRECTION

PATENT NO. : 6,025,065          Page 1 of 2
DATED : February 15, 2000
INVENTOR(S) : Claussen et al It is certified that error appears in the above-indentified patent and that said Letters Patent is hereby corrected as shown below:

In the cover page, under the section titled FOREIGN PATENT DOCUMENTS, 1st row, change "European Pat. Off. ." to read as - - European Pat. Off. Nagle et al.- -.

In the cover page, under the section titled FOREIGN PATENT DOCUMENTS, 2nd row, change "European Pat. Off. ." to read as - - European Pat. Off. Claussen et al. - -.

In the cover page, under the section titled FOREIGN PATENT DOCUMENTS, 3rd row, change "European Pat. Off. ." to read as - - European Pat. Off. Marikawa et al. - -.

In the cover page, under the section titled FOREIGN PATENT DOCUMENTS, 4th row, change "European Pat. Off. ." to read as - - European Pat. Off. Inuzaka et al.- -.

In the cover page, under the section titled Abstract, change "on" to read as - - one - -.

In column 1, line 50, change "AM" to read as - - Am - -.

In column 1, line 63, change "premeated" to read as - - permeated - -.

In column 2, line 25, change "infiltrated" to read as - - Infiltrated - -.

UNITED STATES PATENT AND TRADEMARK OFFICE
CERTIFICATE OF CORRECTION

PATENT NO. : 6,025,065

DATED : February 15, 2000

INVENTOR(S) : Claussen et al

It is certified that error appears in the above-indentified patent and that said Letters Patent is hereby corrected as shown below:

In column 4, line 52, change "tow" to read as - - two - -.

In column 11, line 21, change "<95%" to read as - - >95% - -.

In column 13, line 64, change "2 steel balls" to read as - - 2 mm steel balls - -.

In column 15, line 39, change "85" to read as - - 65 - -.
In column 15, line 54, change "al" to read as - - Al - -.
In column 16, line 34, change "dispersed" to read as - - dispursed - -.

Signed and Sealed this

Thirteenth Day of March, 2001

*Attest:*

NICHOLAS P. GODICI

*Attesting Officer*  Acting Director of the United States Patent and Trademark Office